Sept. 28, 1943.　　　　H. E. MUCHNIC　　　　2,330,305
TRUCK BOLSTER SUSPENSION MEANS
Filed March 27, 1940　　　　2 Sheets-Sheet 1
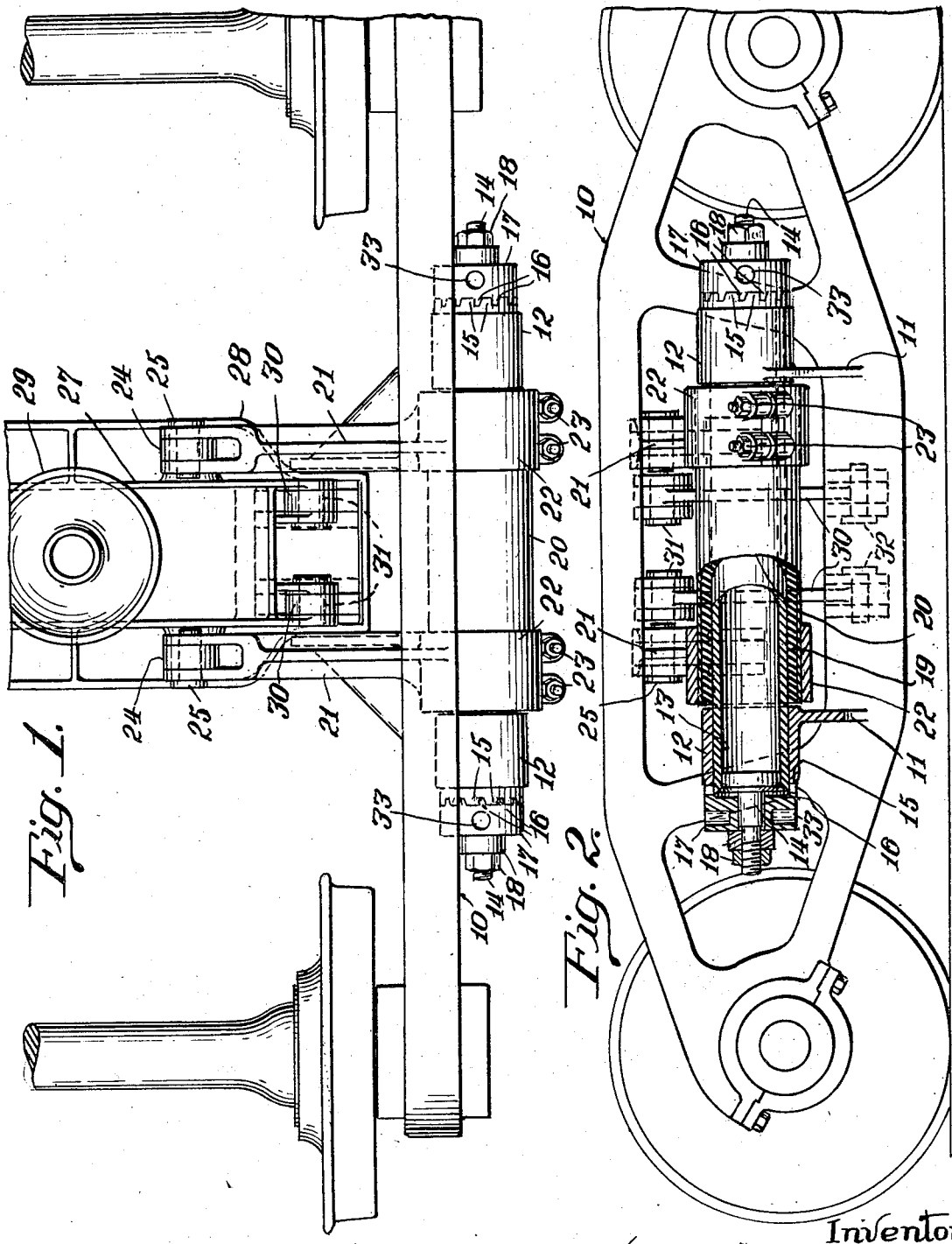

Sept. 28, 1943.   H. E. MUCHNIC   2,330,305
TRUCK BOLSTER SUSPENSION MEANS
Filed March 27, 1940   2 Sheets-Sheet 2
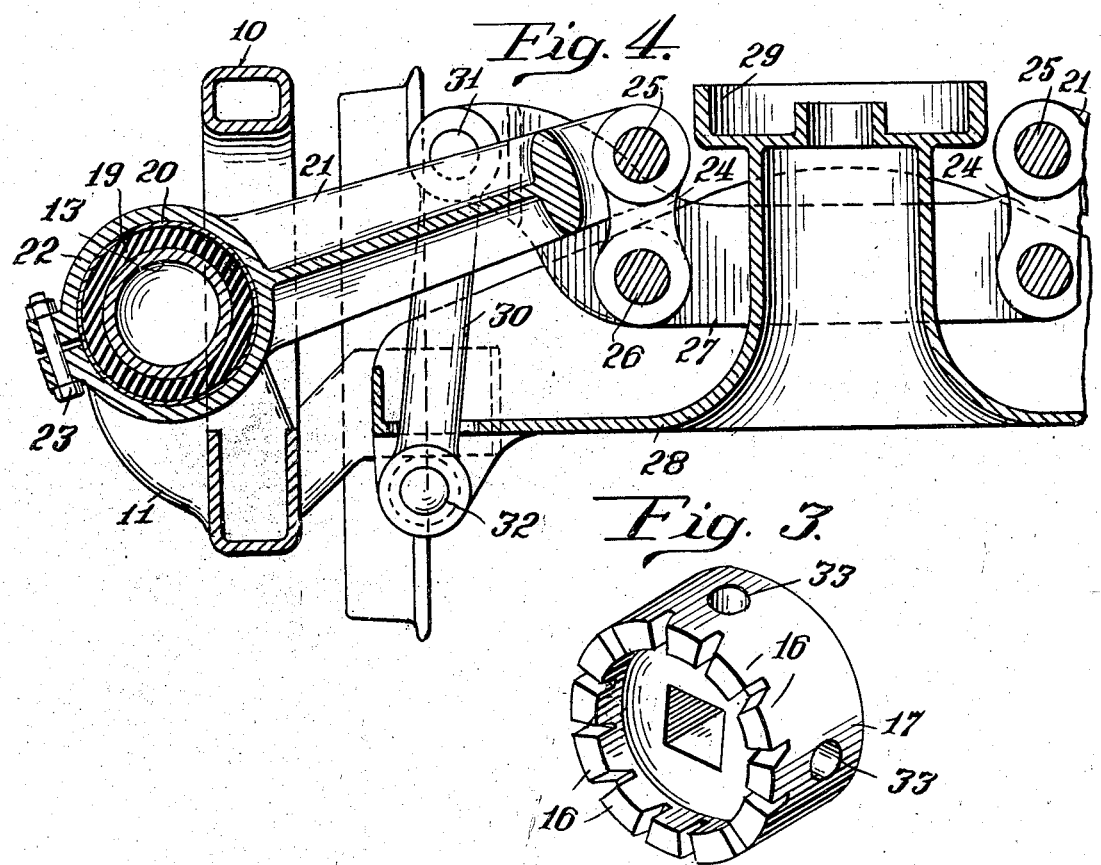
Inventor
Henry E. Muchnic
By
Attorney Patented Sept. 28, 1943

2,330,305

UNITED STATES PATENT OFFICE 2,330,305

TRUCK BOLSTER SUSPENSION MEANS

Henry E. Muchnic, Atchison, Kans., assignor to The Locomotive Finished Material Company, Atchison, Kans., a corporation of Kansas Application March 27, 1940, Serial No. 326,197

11 Claims. (Cl. 105—190)

My invention relates to means which is more especially intended for use with the truck of railroad cars and has for its object the provision of mechanism whereby the truck bolster will be swingingly supported in place through the medium of shock absorbing elements.

The invention contemplates a bolster supporting frame or cradle by which the bolster is pendently supported in place while the supporting frame or cradle is yieldingly supported from the truck side frames by spring suspension mechanism adapted to be placed under regulable torsion, whereby the jolts or shocks encountered by the truck frame will be absorbed and a more resilient and easier riding truck provided.

The objects of my invention and its advantages will all be readily comprehended from the following detailed description of the accompanying drawings wherein:

Figure 1 is a plan view of one side of a railroad car truck provided with my invention.

Figure 2 is a side elevation of the truck with a portion of the elements of my invention shown in section.

Figure 3 is a detailed perspective view of a tension regulating member.

Figure 4 is a transverse sectional view with portions in elevation.

My invention, for purposes of illustration, has been shown applied to an A-type frame 10 whose ends terminate in journal receiving sockets while the lower member or rail of the truck frame on its outer face in proximity to the transverse center of the truck is provided with a pair of upwardly disposed brackets 11, 11 terminating at top in cylindrical hub portions 12 disposed in a direction lengthwise of the truck.

These bracket-hubs 12 rotatably support the longitudinally extending rod 13, which preferably is in the nature of a tubular member with each end provided with a stud 14, welded or otherwisely rigidly secured in the end of the tube; the outer end of the stud having a non-circular portion and a cylindrical threaded portion.

The outer annular face of each hub 12 of the bracket 11 is provided with an annular row of suitable teeth 15 adapted to match and form locking engagement with the annularly arranged teeth 16 of the ratchet wheel 17 shown in detail in Figure 3. The ratchet wheel 17 is shown provided with a non-circular hole matching the non-circular portion of the outer end of the stud 14—or non-circular end of a solid rod—and the ratchet wheel is held on the studs 14 by suitable washers and nuts 18 which screw onto the threaded ends of the studs and normally clamp the ratchet wheel in meshing relation with the toothed surfaces of the supporting brackets 11, 12 and hold the rod 13 against rotation.

The rod or tube 13 is provided with a comparatively thick rubber element or sleeve 19 which is preferably vulcanized to the tubular rod 13; the rubber element preferably extending lengthwise of the rod 13 intermediate of the brackets 12, 12 at opposite ends of the suspension mechanism.

The rubber sleeve or element 19 is shown encased in a cylindrical metal shell 20 to which the rubber element 19 is also preferably vulcanized so that relative movement between rod 13 and shell 20 will place the rubber element under tension and hence offer a torsional resistance to the non-rigidly held shell 20.

The shell 20, adjacent the hubs of brackets 11, 11, has a pair of lever arms 21 secured thereto; the lever arms being shown with split hubs 22 whose sections are drawn into firm gripping and non-rotating relation with the shell 20 by suitable bolts as at 23.

The lever arms 21 extend inwardly and upwardly through the truck side frame as more clearly seen in Figure 4; and the inner ends of the lever arms 21 are shown bifurcated to receive the ends of links 24 whose upper ends are pivotally supported between the bifurcations of the arms 21 by pins 25.

The lower ends of the links 24 are pivotally secured at 26 to a cradle member 27 which is in the nature of a box-like skeleton frame disposed lengthwise of the bolster 28 on opposite sides of the center bearing portion 29, as shown in Figures 1 and 4.

Each end of cradle member 27 is shown preferably provided with a pair of links 30 pivotally connected at their upper ends at 31 to the cradle member while the lower ends of the links 30 are pivotally connected at 32 to suitable lugs formed on the bolster 28, see Figure 4; the links 30 pendently supporting the bolster from the yieldingly supported cradle member 27.

It is apparent from the construction shown and described that the bolster is swingingly suspended from the cradle member so not only to have movement transversely of the truck but also cushioned vertical movement through the medium of the cradle which is yieldingly supported by the torsional suspension mechanism whose resistance or tension is regulated by properly rotating the respective ratchet wheels 17. The ratchet wheels 17 have tool or pipe receiving holes 33, see Figure 3, and rotation of these wheels or members is possible upon unscrewing the nuts 18 at the ends of the rods or tubular members 13 which extend lengthwise of the side frames at opposite sides of the truck; the nuts 18 being unscrewed just sufficiently to permit free movement of the teeth 16 of the wheels or members 17 over the teeth 15 at the ends of the longitudinal rods or tubular members 13.

With the suspension mechanism described, the usual bolster supporting springs and the journal-box metallic springs are eliminated and a non-metallic shock absorbing connection between the truck frames and the bolster is provided with the result that the wheel movements and jolts will not be transmitted to the bolster and the car body supported thereon and hence a smoother riding car provided.

The exemplification is believed to be the simplest embodiment of the invention and has been described in terms employed for purposes of description and not as terms of limitation as structural modifications may be made without, however, departing from the spirit of the invention as defined in the appended claims.

What I claim is:

1. Means of the character described comprising, in combination with the side frames of a car truck and a truck bolster, members rotatably mounted on the truck side frames and disposed lengthwise thereof; lever members disposed inwardly from the truck side frames with the outer ends supported by said first mentioned members so as to permit their inner ends to swing vertically; torsion providing means intermediate outer ends of the lever members and said first mentioned members whereby the swinging movements of the inner ends of the lever members are yieldingly resisted; means whereby the first mentioned members are held against rotation and means intermediate of the inner ends of the lever members on both sides of the truck and the bolster whereby the latter is yieldingly suspended in place.

2. Truck bolster suspension means comprising, in combination with the side frames of a car truck provided with a transversely disposed bolster, lever members disposed inwardly from the truck side frames; means whereby the outer ends of the lever members are fulcrumed on the side frames to permit the inner ends of the lever members to oscillate vertically, said means involving vibration absorbing elements; regulable means whereby said elements are placed in tension; a frame disposed transversely of the truck on opposite sides of the bolster, said frame being swingingly supported from the inner ends of said lever members; and means whereby the bolster is swingingly supported from said frame.

3. Truck bolster suspension means comprising, in combination with the side frames of a car truck and a truck bolster; brackets on the truck side frames; rod members mounted in the brackets of the truck side frames; means operatively intermediate of the brackets and their respective rod members whereby the latter may be rotated and held in their rotated position; shock absorbing rubber elements secured on said rod members; lever members disposed in a direction transversely of the truck and provided with elongated hub portions at the outer ends, with said hub portions encircling said rubber elements and secured thereto; a cradle member disposed lengthwise of the bolster and pivotally connected to the inner ends of the lever members; and means whereby the truck bolster is pendently supported from the cradle member.

4. Truck bolster suspension means comprising, in combination with the side frames of a truck and a truck bolster, a pair of brackets secured in spaced relation on the outer faces of each truck side frame; a rod member disposed lengthwise of the truck through each pair of brackets; ratchet mechanism operatively intermediate of the brackets and the ends of said rod member whereby the latter may be rotated and held in its rotated position; a rubber sleeve vulcanized on each rod member; lever members disposed transversely of the truck and provided with laterally disposed tubular portions at their outer ends adapted to encircle the rubber sleeve and to be secured thereto; a cradle member disposed transversely of the truck on each side of the bolster, said cradle member being pendently secured to the inner ends of the lever members; and links pivotally secured to the cradle member and to the bolster whereby the latter is swingingly supported from the cradle member.

5. Truck bolster suspension means comprising, in combination with the side frames of a car truck and a truck bolster, brackets secured to the outer faces of the truck side frames; longitudinal members rotatably mounted in the brackets; regulable ratchet mechanism operatively intermediate of the brackets and said longitudinal members whereby the latter may be rotated and locked in their rotated positions; rubber sleeves vulcanized on said longitudinal members; metallic shells arranged on the rubber elements and vulcanized thereto; lever members disposed transversely of the truck with their outer ends secured to said shells against independent movement; a cradle member disposed transversely of the truck adjacent the bolster; link connections intermediate of the inner ends of the lever members and the cradle member whereby the latter is pendently supported in place; and link connections between the cradle member and the bolster whereby the latter is pendently supported from the cradle member.

6. Means of the character described comprising, in combination with the side frames of a car truck and a truck bolster, lever members disposed inwardly from the side frames of the truck; means secured to the truck side frames whereby the outer ends of said lever members are supported in place and their inner ends permitted to oscillate vertically, said means involving rotatable members, means for rotating and locking said members in rotated positions and vibration absorbing torsion providing elements intermediate of said rotatable members and the outer ends of the lever members; and cradle means disposed on opposite sides of the bolster and fulcrumed on the inner ends of the lever members and pivotally connected with the bolster whereby the truck bolster is swingingly supported.

7. Means of the character described comprising, in combination with the side frame of a car truck and a truck bolster; torsion providing and load carrying means secured on the truck side frame involving a rod, a rubber sleeve vulcanized to the rod and a shell disposed about the sleeve and operatively secured thereto; lever members disposed inwardly from the side frame with their outer ends secured to the shell of said torsion providing and load carrying means while their inner ends are adapted to swing vertically and to support the bolster.

8. Means of the character described comprising, in combination with the side frame of a car truck and a truck bolster; a rod rotatably supported on the side frame and extending lengthwise thereof; a rubber sleeve non-rotatably secured on said rod; a metallic shell disposed about the sleeve and intimately secured thereto; lever members whose outer ends are fixedly secured to said shell while their inner ends yieldingly support the truck bolster; and regulable means operatively intermediate of the side frame and said rod whereby the latter may be rotated and the torsion of the rubber sleeve regulated.

9. Means of the character described comprising, in combination with the side frame of a car truck having a window opening and a truck bolster; torsion providing means adjustably secured on the truck side frame adjacent the window opening; rotatable means operatively intermediate the side frame and said torsion means whereby the latter is controlled; lever members disposed inwardly through the window opening of the side frame and disposed at opposite sides of the truck bolster with their outer ends secured to said torsion providing means and their inner ends adapted to swing vertically; and laterally swinging mechanism disposed lengthwise of the bolster between the inner ends of the lever members and the bolster and yieldably secured thereto whereby the latter is yieldingly supported in place and permitted vertical and lateral movement.

10. Means of the character described comprising, in combination with the side frames of a car truck having window openings and a truck bolster; torsion providing and load carrying means secured to the side frames, said means involving a rotatable rod with a rubber sleeve vulcanized thereto intermediate its ends and ratchet mechanism at the ends of the rod whereby the latter may be rotated and held in its rotated positions; a pair of vertical swinging levers on each side of the truck with their outer ends secured to said means and disposed inwardly through the window openings on opposite sides of the bolster; and composite mechanism having pivoted connection with the inner ends of the levers at opposite sides of the truck and with the bolster whereby the latter is yieldingly supported to have vertical and lateral movement.

11. Means of the character described comprising, in combination with the side frames of a car truck provided with window openings and brackets adjacent the window openings and a truck bolster, lever members disposed inwardly through the window openings at opposite sides of the truck and arranged on opposite sides of the bolster with their inner ends adapted to swing vertically; shock absorbing torsion providing means mounted on the truck side frames adjacent said window openings whereby the outer ends of the lever members are secured to the truck side frames, said means involving a rod whose ends are rotatably mounted in said brackets, a rubber sleeve on the rod intermediate the brackets and vulcanized to the rod, and a shell surrounding said sleeve and vulcanized thereto, with the outer ends of said lever members clamped thereon; ratchet mechanism operatively intermediate the brackets and the ends of said rod whereby the latter may be rotated into torsion regulating position and locked in place; and composite pivot providing means intermediate the inner ends of said lever members and the bolster whereby the latter is swingingly supported in place.

HENRY E. MUCHNIC.